Oct. 9, 1923.
K. HELLENTHAL
VEHICLE SUSPENSION MEANS
Filed Feb. 2, 1920
1,469,788
2 Sheets-Sheet 2
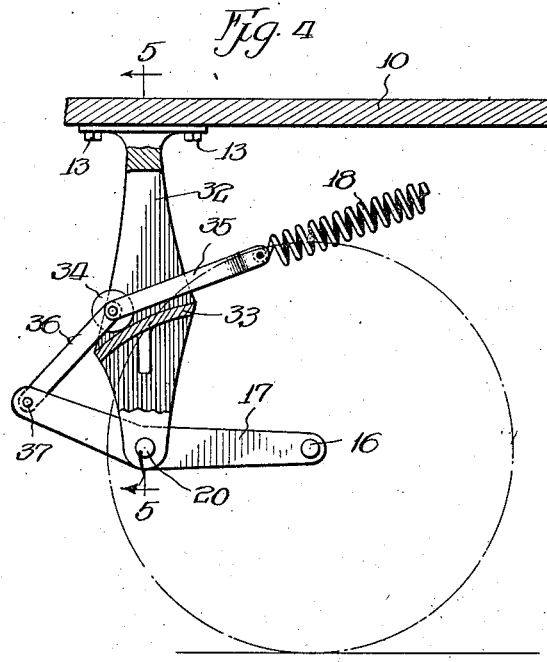
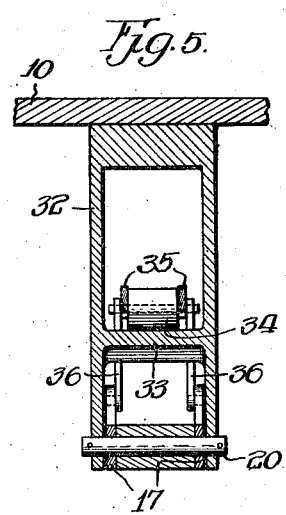
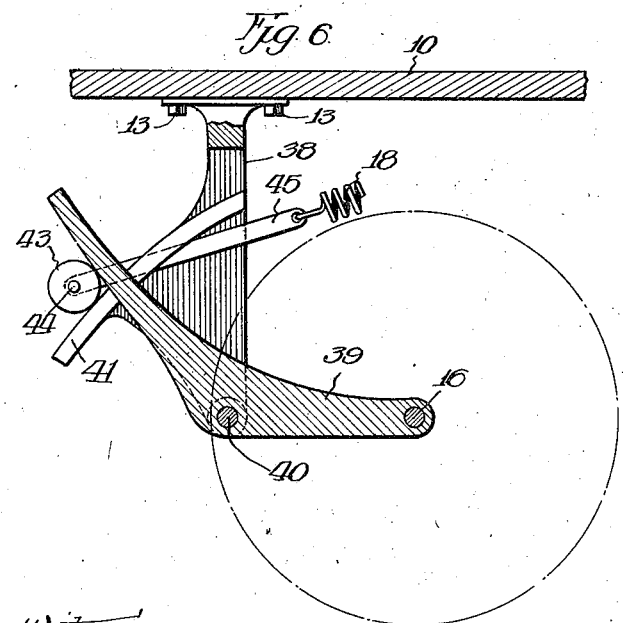
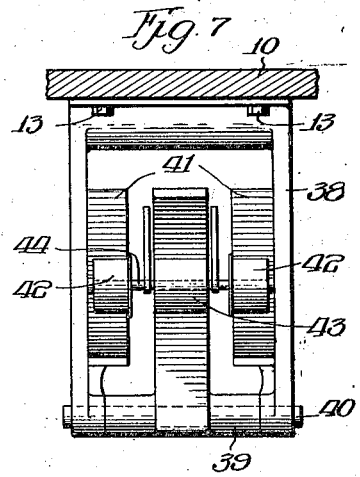

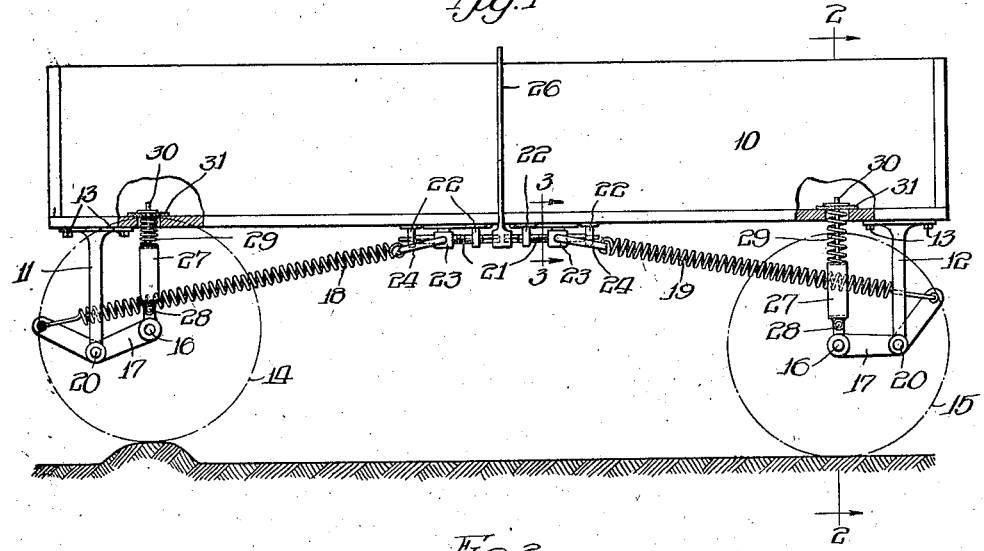
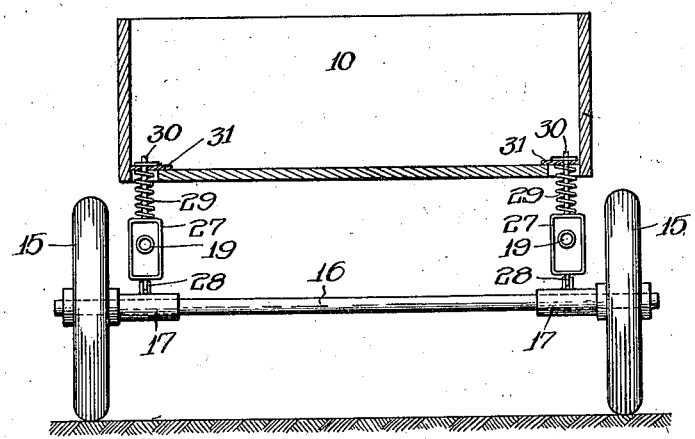
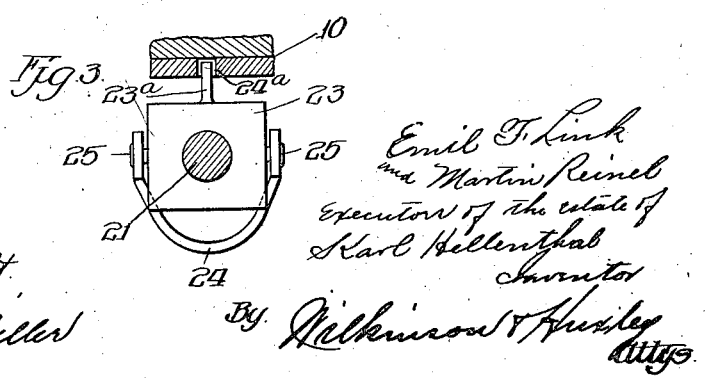

Patented Oct. 9, 1923.

1,469,788

UNITED STATES PATENT OFFICE.

KARL HELLENTHAL, DECEASED, LATE OF CHICAGO, ILLINOIS; BY EMIL F. LINK AND MARTIN REINEL, EXECUTORS.

VEHICLE SUSPENSION MEANS.

Application filed February 2, 1920. Serial No. 355,834.

*To all whom it may concern:*

Be it known that KARL HELLENTHAL, deceased, a citizen of the United States, formerly residing at Chicago, in the county of Cook and State of Illinois, has invented certain new and useful Improvements in Vehicle Suspension Means, of which the following is a specification.

This invention relates to vehicle suspension means and particularly to means for suspending and carrying automobile bodies.

The primary object of the invention is the provision of spring suspension means which will carry the weight of the automobile body and passengers or other load carried thereby in such manner that a minimum of shocks will be imparted to the vehicle body as the wheels meet with obstructions in the roadway.

Another and further object of the invention is the provision of a vehicle suspension means which can be changed to meet varying load conditions of the vehicle and also to compensate for the various weights of the vehicle body.

Another and further object of the invention is the provision of vehicle suspension means arranged in such manner that the shocks caused by the wheels of the vehicle striking obstructions in the roadway are counteracted and neutralized by the springs and, in the manner of suspending the vehicle body, without imparting such shocks to the vehicle body.

Still another and further object of the invention is the provision of vehicle suspension means comprising a set of bell cranks supporting the weight of the vehicle body and secured at one of their ends to the vehicle axle by suitable connections, with coil springs connected to another part of the vehicle and to the free ends of the bell cranks, the angle of the bell cranks and the methods of sustaining them in position being such that the leverage of the coil springs, will be in the exact proportion to the stress to which the said coil springs are subjected, that is, in the same proportion as the stress in the coil springs increases their leverage decreases and vice versa, thus maintaining the vehicle body in equilibrium at all times.

Still another object of the invention is the provision of means for suspending the vehicle which will be simple in construction and which will be efficient in operation.

These and other objects of the invention will be more fully and better understood by reference to the accompanying drawings, and in which—

Figure 1 is a side elevation view of a vehicle embodying my invention;

Figure 2 is a sectional view on line 2—2 of Figure 1;

Figure 3 is a detail view taken on line 3—3 of Figure 1;

Figure 4 is a modified form of bracket for use in connection with the invention;

Figure 5 is a sectional view taken on line 5—5 of Figure 4;

Figure 6 is a modified form of bracket and bell crank; and,

Figure 7 is an end elevation of the bracket and bell crank shown in Figure 6.

Referring now specifically to the drawings and in which like reference characters refer to like parts throughout, a vehicle body 10 is shown to which a pair of front and rear brackets 11 and 12 respectively are secured by means of bolts 13. Front and rear wheels 14 and 15 respectively are provided which are mounted upon axles 16 in the usual manner. Bell cranks 17 are mounted upon the axles 16 and have coil springs 18 and 19 respectively secured to their free ends, the said valve cranks comprising the horizontally extending arm and an arm extending upward therefrom at an angle of approximately forty-five degrees. The brackets 11 and 12 are secured to the bell cranks by means of pins 20 or in any other suitable manner. A pair of threaded spindles 21, 21 are provided which are mounted within suitable brackets 22, 22, which are secured to the body 10 in any suitable manner. Mounted upon the spindles 21 and in threaded engagement therewith is a pair of nuts 23, 23 to which links 24 are secured by means of pins 25, 25. The springs 18 and 19 are secured to the nuts 23 by means of the links 24. A lever 26 is carried by the spindles 21 which have the squared ends fitted into the lower end of the lever 26. The lever 26 can be moved forwardly or rearwardly out of engagement with either one of the spindles 21, so that each of the spindles 21 can be adjusted to different positions irrespective of the other or the lever 26 may be used, as shown in the drawing, in engagement with both of the spindles 21, so that both can be turned at the same time one of said spindles having right hand threads, while the other has left hand threads. A suitable ratchet mechanism may be used to turn the spindles 21 instead of a lever, as shown. Pins 23ª project upwardly from the nuts 23 into slots 24ª in the bottom of the vehicle body and prevent turning of the nuts 23 upon the spindles 21. Yokes 27 are provided which are secured to the bell cranks 17 by means of pins 28, the springs 18 and 19 passing through the said yokes 27. Auxiliary coil springs 29 are provided which are mounted on the yokes 27 and are interposed between the body 10 of the vehicle and the yokes 27, and which are adapted to carry approximately one-fourth of the weight of the vehicle and load. Pins 30 project upwardly from the yokes 27 and serve as guiding and retaining means for the auxiliary springs 29. Bearing plates 31 are secured to the vehicle body against which the springs 29 are seated. It will thus be understood that the vehicle body 10 is supported by the brackets 11 and 12 which are secured to the bell cranks and the bell cranks in turn are held in proper position by means of the springs 18 and 19, and the axle 16.

Referring now to Figures 4 and 5 in which a modified form of the device is shown, a bracket 32 is provided which is secured to the vehicle body 10 by means of bolts 13, 13, the lower end of the bracket being secured to the bell crank 17 by means of a pin 20. The bracket 32 has a curved track 33 intermediate its upper and lower ends and which forms a bearing surface for a roller 34 to which is secured a link 35 which has a coil spring 18 attached thereto. A pair of links 36 connect the roller 34 with the forward end of the bell crank 17 by means of pin 37. As the axle 16 is raised and lowered by reason of the wheels striking obstructions in the roadway, the bell crank will be oscillated and the roller 34 will travel upon the curved track 33 of the bracket 32, the angle of the bell crank 17 and the shape of track 33 being such that as the tension of the spring 18 is changed by reason of the upward and downward movement of the axle 16 the leverage of the spring, will be correspondingly decreased or increased, thus keeping the vehicle body in equilibrium at all times.

Referring now to Figures 6 and 7, a bracket 38 is shown which is secured to the vehicle body 10 by means of bolts 13, 13. A bell crank 39 is secured to the axle 16, the said bracket 38 being secured at its lower end to the bell crank 39 by means of a pin 40. On the inner sides of the bracket 38 is provided a pair of inclined track portions 41 integral with the bracket 38 and with which rollers 42, 42 contact. A roller 43 is provided which is mounted upon a pin 44 extending through the rollers 42, 42. Links 45 connect the pin 44 with the coiled spring 18 and thus the weight of the car is suspended upon the bell crank 39, the outer end of which is held in position by means of the spring 18 acting through the links 45 and the rollers 42 and a single roller 43 which is in contact with the outer end of the bell crank 39. In this form of the device the springs are not connected to the bell cranks but the outer end of the bell crank is supported by means of the roller 43 upon which the bell crank rests.

It will now be understood that the total load is carried by the coil springs and by the light auxiliary springs. The coil springs are so arranged through the proper disposition of the bell cranks that their supporting power remains constant for any position of the axles; as described before, the light auxiliary springs change in their supporting power with the varying positions of the axles, they act, therefore, as a cushioning device for any unusual forces outside of the weight of the car body.

As the wheels strike an obstruction in the road the axles will be lifted up, the bell cranks oscillated and the auxiliary springs compressed. The oscillating of the bell cranks having no effect on the supporting power of the coil springs, the only thing disturbing the equilibrium of the vehicle body is, therefore, the change in the compression of the auxiliary springs, and this change is the smaller the lighter the auxiliary springs are. After the wheel has met with and passed over an obstruction the bell cranks will, of course, return to their normal position through the action of the auxiliary springs 29. By means of the lever 26 the springs 18 and 19 can be adjusted to any varying condition of load for the vehicle or for weight of the vehicle body as may be desired. It will thus be understood that the vehicle body will be carried in a constant state of equilibrium and that instead of having shocks imparted directly to the vehicle body, as is the case with ordinary automobile construction, the shocks will be absorbed by the coil springs 18 and 19 and by the auxiliary springs 29 without subjecting the vehicle body to such shocks.

It will be further understood with both the modified forms the auxiliary springs and yoke connections are employed and are connected to the bell cranks in the same manner as shown in Figures 1 and 2 of the drawings.

While we have described more or less precisely the details of construction, we do not wish to be understood as being limited thereto, as such changes in form and in the proportion of parts and the substitution of equivalents as circumstances may suggest or

Claims:

1. In combination, a vehicle body, a pair of vertically movable axles, supporting members carried by said axles connected to the vehicle body at their upper ends, wheels mounted upon the said axles, an auxiliary supporting means comprising bell crank levers pivotally mounted at one of their ends to said axles, springs secured to the said bell cranks at their free ends, adjustable fastening means for securing the said springs to the vehicle body and vertically extending brackets connected to the vehicle body at their upper ends and to the bell cranks at their lower ends, the bell cranks comprising a pair of arms extending each way from the point of support of the vertically extending brackets at an angle of approximately forty-five (45) degrees to each other.

2. In combination, a vehicle body, a pair of vertically movable axles, supporting members carried by said axles connected to the vehicle body at their upper ends, wheels mounted upon the said axles, an auxiliary supporting means comprising bell crank levers pivotally mounted at one of their ends to said axles, springs secured to the said bell cranks at their free ends, adjustable fastening means for securing the said springs to the vehicle body and vertically extending brackets connected to the vehicle body at their upper ends and to the bell cranks at their lower ends, the bell cranks having a horizontal arm and an arm extending upwardly therefrom at an angle of approximately forty-five (45) degrees, the said vertically extending brackets being connected to the said bell cranks at the juncture of the two arms.

3. In combination, a vehicle body, a pair of vertically movable axles, wheels mounted upon said axles, bell crank levers pivotally mounted at one of their ends to said axles, vertically extending supporting yokes secured to said vehicle body at one of their ends and fastened to said bell crank at their lower ends, coil springs adjustably secured to said vehicle body at one of their ends, a pair of links connecting the free ends of said bell crank levers and said spring, rollers secured to said links, and tracks within said yokes upon which said rollers operate.

EMIL F. LINK,
MARTIN REINEL,
*Executors of Karl Hellenthal, deceased.*